United States Patent
Tian et al.

(10) Patent No.: US 9,490,622 B2
(45) Date of Patent: Nov. 8, 2016

(54) OVER-CURRENT PROTECTION DEVICE FOR EXPANSION CARDS

(71) Applicant: ShenZhen Treasure City Technology Co., LTD., Shenzhen (CN)

(72) Inventors: Bo Tian, Shenzhen (CN); Kang Wu, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 0 days.

(21) Appl. No.: 14/490,287

(22) Filed: Sep. 18, 2014

(65) Prior Publication Data

US 2015/0171616 A1 Jun. 18, 2015

(30) Foreign Application Priority Data

Dec. 13, 2013 (CN) .......................... 2013 1 06778430

(51) Int. Cl.
*H02H 3/08* (2006.01)
(52) U.S. Cl.
CPC ...................... *H02H 3/08* (2013.01)
(58) Field of Classification Search
USPC ................ 361/56, 784; 365/51, 52, 63
See application file for complete search history.

(56) References Cited

U.S. PATENT DOCUMENTS

| | | | | |
|---|---|---|---|---|
| 4,945,445 A | * | 7/1990 | Schmerda | G01R 1/203 323/277 |
| 8,942,057 B1 | * | 1/2015 | Xiao | G11C 5/143 361/784 |
| 2002/0011516 A1 | * | 1/2002 | Lee | G06F 3/0227 235/380 |
| 2013/0128383 A1 | * | 5/2013 | Wu | G06F 11/325 360/79 |
| 2013/0166809 A1 | * | 6/2013 | Xiao | G06F 13/4072 710/305 |
| 2013/0328580 A1 | * | 12/2013 | Tian | G01R 31/40 324/713 |
| 2014/0085947 A1 | * | 3/2014 | Capilla | H02M 1/4225 363/52 |

* cited by examiner

*Primary Examiner* — Thienvu Tran
*Assistant Examiner* — Angela Brooks
(74) *Attorney, Agent, or Firm* — Zhigang Ma

(57) ABSTRACT

An over-current protection device is provided. A first end of a first resistor is coupled to a voltage input terminal and a second end of the first resistor is coupled to a control terminal of an electronic switch. A detecting pin of a control chip is coupled to the second end of the first resistor and an input pin of the control chip is coupled to the first end of the first resistor. A control pin of the control chip is coupled to a control terminal of the electronic switch. The voltage output terminal is coupled to a first terminal of the electronic switch. The control chip compares a preset current value saved therein with a detecting current passing through the first resistor. If the detecting current is greater than the preset current value, there is no voltage output from the voltage output terminal.

4 Claims, 1 Drawing Sheet

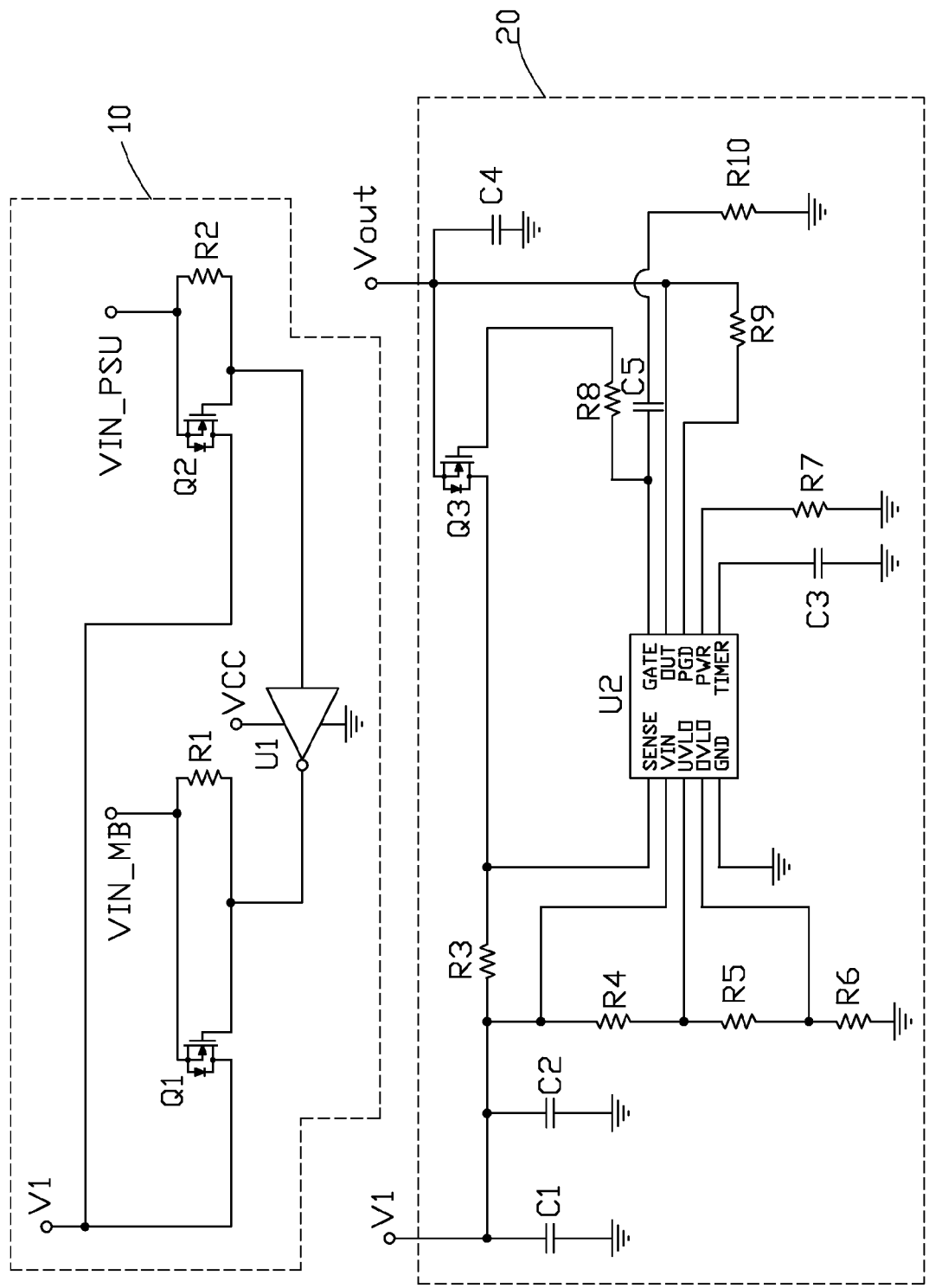

OVER-CURRENT PROTECTION DEVICE FOR EXPANSION CARDS

FIELD

The present disclosure relates to an over-current protection device for an expansion card.

BACKGROUND

Expansion cards are coupled to a motherboard to add to or enhance functionality of the electronic device configured with the expansion cards and the motherboard. The expansion cards need to be powered by the motherboard or a power supply unit (PSU) of the motherboard. When over currents or short circuits occur in the expansion cards, the motherboard can be damaged.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The FIGURE is a circuit diagram of an embodiment of an over-current protection device.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

FIG. 1 illustrates an over-current protection device for an expansion card (not shown). The protection device includes a power supply circuit 10 for powering the expansion card, and a detection circuit 20.

The power supply circuit 10 includes resistors R1 and R2, transistors Q1 and Q2, an inverter U. In the embodiment, the transistors Q1 and Q2 can be electronic switches and are n-channel Metal-Oxide-Semiconductor Field Effect Transistors (MOSFETs). Sources of the transistor Q1 and Q2 are coupled to a voltage input terminal V1. A drain of transistor Q1 is coupled to a pin VIN_MB receiving power from a motherboard. A drain of transistor Q2 is coupled to a pin VIN_PSU receiving power from a power supply unit (PSU). A gate of transistor Q1 is coupled to an input of the inverter U1. A gate of transistor Q2 is coupled to an output of the inverter U1. The resistor R1 is coupled between the pin VIN_MB and the output of the inverter U1. The resistor R2 is coupled between the pin VIN_PSU and the input terminal of the inverter U1.

In the embodiment, the expansion card is powered in a dual power supply mode, that is, powered by the motherboard and the PSU of the motherboard.

When the expansion card is powered by the motherboard, the pin VIN_MB receive a logic 1 signal and the transistor Q1 is turned on; the pin VIN_PSU receives logic 0 signal and the transistor Q2 is turned off. The motherboard provides a power to voltage input terminal through the pin VIN_MB and the transistor Q1.

When the expansion card is powered by the PSU, the pin VIN_PSU receives a logic 1 signal and the transistor Q2 is turned on. The input of the inverter U1 receives a logic 1 signal and the output of the inverter U1 outputs a logic 0 level signal, the transistor Q1 is turned off. The PSU provides a power to voltage input terminal through the pin VIN_PSU and the transistor Q2.

In another embodiment, the expansion card can be powered in a single power supply mode, that is, powered by the motherboard or the PSU of the motherboard. The power supply circuit 10 can be omitted and the voltage input terminal can be directly coupled to the motherboard or the PSU.

The detection circuit 20 includes capacitors C1, C2, C3, C4 and C5, resistors R3, R4, R5, R6, R7, R8, R9 and R10, a control chip U2, a transistor Q3. In the embodiment, the transistors Q3 can be an electronic switch and an n-channel MOSFET. The resistor R3 includes a first end coupled to the voltage input terminal V1 and a second end coupled to a gate of the transistor Q3. The capacitors C1 and C2 are coupled in parallel between the first end of the resistor R3 and ground. The resistors R4, R5, and R6 are coupled in series between the first end of the resistor R3 and ground. A source of the transistor Q3 is coupled to the second end of the resistor R3. A drain of the transistor Q3 is coupled to a voltage output terminal Vout. The drain of the transistor Q3 is grounded through the capacitor C4. A detecting pin SENCE of the control chip U2 is coupled to the second end of the resistor R3. An input pin VIN of the control chip U2 is coupled to the first end of the resistor R3. A node between the resistor R4 and R5 is coupled to an input/output pin UVLO of the control chip U2. A node between the resistor R5 and R6 is coupled to an input/output pin OVLO of the control chip U2. A ground pin GND of the control chip U2 is grounded. A gate of the transistor Q3 is coupled to a control pin GATE of the control chip U2 through the resistor R8. The control pin GATE is grounded through the capacitor C5 and the resistor R10 coupled in series. An output pin OUT of the control chip U2 is coupled to the voltage output terminal VOUT. The voltage output terminal VOUT is also coupled to an input/output pin PGD of the control chip U2 through the resistor R9. An input/output pin PWR is grounded through the resistor R7. A clock pin TIMER of the control chip U2 is grounded through the capacitor C3.

The detecting pin SENSE and the input pin VIN detect a current passing through the resistor R3. The control chip U2 compares a preset current value saved therein with the detecting current value. The preset current value can be adjusted by selecting the resistor 10 with a corresponding resistance.

If the detecting current value is less than the preset current value, a logic 1 signal is output from the control pin GATE of the control chip U2 to the gate of the transistor Q3. The transistor Q3 is turned on, the power of the voltage input terminal V1 is output to the voltage output terminal Vout through the resistor R3 and the transistor Q3, for powering the expansion card.

If the detecting current value is greater than or equal to the preset current value, a logic 0 signal is output from the control pin GATE of the control chip U2 to the gate of the transistor Q3. The transistor Q3 is turned off, no power is output to the voltage output terminal Vout, for protecting the expansion card and the motherboard from damage.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. An over-current protection device, comprising:
a voltage input terminal;
a voltage output terminal;
a first resistor with a first end coupled to the voltage input terminal;
a second resistor;
an electronic switch comprising a control terminal, a first terminal coupled to the voltage output terminal, and a second terminal coupled to a second end of the first resistor, wherein the electronic switch is an N channel MOSFET, the control terminal, the first terminal, and the second terminal are gate, drain, and source of the electronic switch;
third, fourth, and fifth resistors coupled in series between a first end of the first transistor and ground; and
a control chip comprising a control pin coupled to the control terminal of the electronic switch and grounded through the second resistor, an input pin coupled the first end of the first resistor, a detecting pin coupled to the second end of the first resistor;
wherein the control chip compares a preset current value saved therein with a detecting current passing through the first resistor, and when the detecting current is greater than or equal to the preset current value, the electronic switch is turned off and no voltage is output from the voltage output terminal; wherein a node between the third resistor and the fourth resistor is coupled to a first input/output terminal of the control chip, and a node between the fourth resistor and the fifth resistor is coupled to a second input/output terminal of the control chip.

2. The protection device of claim 1, wherein a sixth resistor is coupled between the control terminal of the electronic switch and the control pin of the control chip.

3. The protection device of claim 2, wherein a seventh resistor is coupled between the voltage output terminal and a third input/output pin of the control chip.

4. The protection device of claim 1, wherein an output pin of the control chip is coupled to the voltage output terminal.

* * * * *